US006210140B1

United States Patent
Degiorgio et al.

(10) Patent No.: US 6,210,140 B1
(45) Date of Patent: Apr. 3, 2001

(54) BENDING TABLE

(75) Inventors: Paul Degiorgio, Merseyside; Peter Turner, Warrington, both of (GB)

(73) Assignee: Universal Arches Limited, Merseyside (GB)

( * ) Notice: Subject to any disclaimer, the term of this patent is extended or adjusted under 35 U.S.C. 154(b) by 0 days.

(21) Appl. No.: 09/222,702

(22) Filed: Dec. 29, 1998

(51) Int. Cl.[7] .......................... B29C 53/02; B29C 53/80
(52) U.S. Cl. ............................... 425/3; 425/392; 425/403
(58) Field of Search .................... 425/3, 383, 392, 425/403, 470; 249/155

(56) References Cited

U.S. PATENT DOCUMENTS 3,530,540 * 9/1970 Mueller ..................................... 425/3
4,695,032 * 9/1987 Desport ................................. 249/155
4,731,144 * 3/1988 Kommineni et al. ................ 249/155

FOREIGN PATENT DOCUMENTS

3322572 * 12/1984 (DE) .

* cited by examiner

Primary Examiner—Robert Davis
(74) Attorney, Agent, or Firm—Dennison, Scheiner, Schultz & Wakeman

(57) ABSTRACT

A bending table upon which lengths of plastics material rendered flexible by heating, may be set to determine a desired curvature thereof, particularly for producing arched UPVC window and door frames, the table including an unslotted ferro-magnetic top (1) and a plurality of bobbins (3) each mounted at the end of a radially extending arm (6,7) the arms being mounted upon independently rotatable spindle members (4) such that the angles subtended by each adjacent arms (6,7) is adjustable and wherein the spindles (4) are themselves may be positioned selectively along a locating strip (16) fixed to the table top. Further arms (17) are adjustable along the strip (16) and extend transversely across the table top to support one or more fences (18). The table enables an arched profile (32) having, if required, straight sections, to be produced to any desired shape, and the magnetically attractive bobbins (3) retain the positions of the arms but can be readily adjusted to suit any desired profile.

18 Claims, 4 Drawing Sheets

BENDING TABLE

THIS INVENTION concerns a bending table upon which lengths of plastics material rendered flexible by heating, may be set to determine a desired curvature thereof and applies particularly to a table for bending UPVC sections to form a decorative arch for window and door frames.

Lengths of uPVC section are rendered flexible by heating the profile to approximately 140° C. in an oven. It can then be shaped as desired and allowed to cool down to room temperature whereupon the section will retain the required shape.

Conventionally, this process is carried out on a table containing a number of angularly spaced straight slots extending radially from a central position, and a similar number of movable bobbins which are adjustable in position along the slots thus to provide a bearing surface to determine the required shape for the section. Usually, a flexible former strip is first placed around the pre-positioned bobbins and then the heated section is bent around the former and clamped in position until cool. Unfortunately, the provision of a slotted surface in the table tends to mark the underside of the softened section and so to overcome this problem it has been necessary to provide a pre-shaped arcuate flat strip of hardboard or the like which is placed over the slots around the bobbins and upon which the section rests while cooling. This necessitates the provision of a large number of such strips to necessitates the provision of a large number of such strips to accommodate every shape and curvature to be formed.

In an alternative known arrangement as described and illustrated in German patent specification DE 3322572, a plain table top is provided with a number of alternative and selectable adaptor platforms each having a plurality of slotted guides extendible radially outwards from the adaptor and arranged to engage a slotted former around which the desired section may be bent.

While this design avoids the marking caused by a slotted table surface, nevertheless the shape and/or radius of the section to be formed is restricted by the minimally adjustable assembly of the adaptors and guides.

There is often a requirement to produce an arched uPVC section profile which is irregular in shape and does not follow the arc of a circle. The arrangement of slots in a slotted table or the arrangement of guides on the adaptor of a plain table does not readily permit the formation of an arched section where the curvature varies throughout its length. Therefore to accommodate a wide range of curvatures and sizes conventional tables presently available are extremely limited in scope and thus largely unsuitable.

According to the present invention there is provided a bending table comprising a table top, and a plurality of arms extending radially across the table top from a supporting member fixed with respect to the table top, at least some of said arms being adjustable in length or interchangeable, each arm having a bearing surface at its free end against which a flexible elongate work piece may be located; characterised in that the angle subtended by the or at least one pair of adjacent arms is adjustable.

According to a further aspect of the invention there is provided a bending table comprising a table top, and a plurality of arms extending across the table top from a supporting member fixed with respect to the table top, at least some of said arms being adjustable in length or interchangeable, each arm having a bearing member at its free end against which a flexible elongate work piece may be located; characterised in that the bearing members and the table surface are mutually magnetically attractive.

Embodiments of the invention will now be described, by way of example only, with reference to the accompanying drawings, in which.

Figure 1:
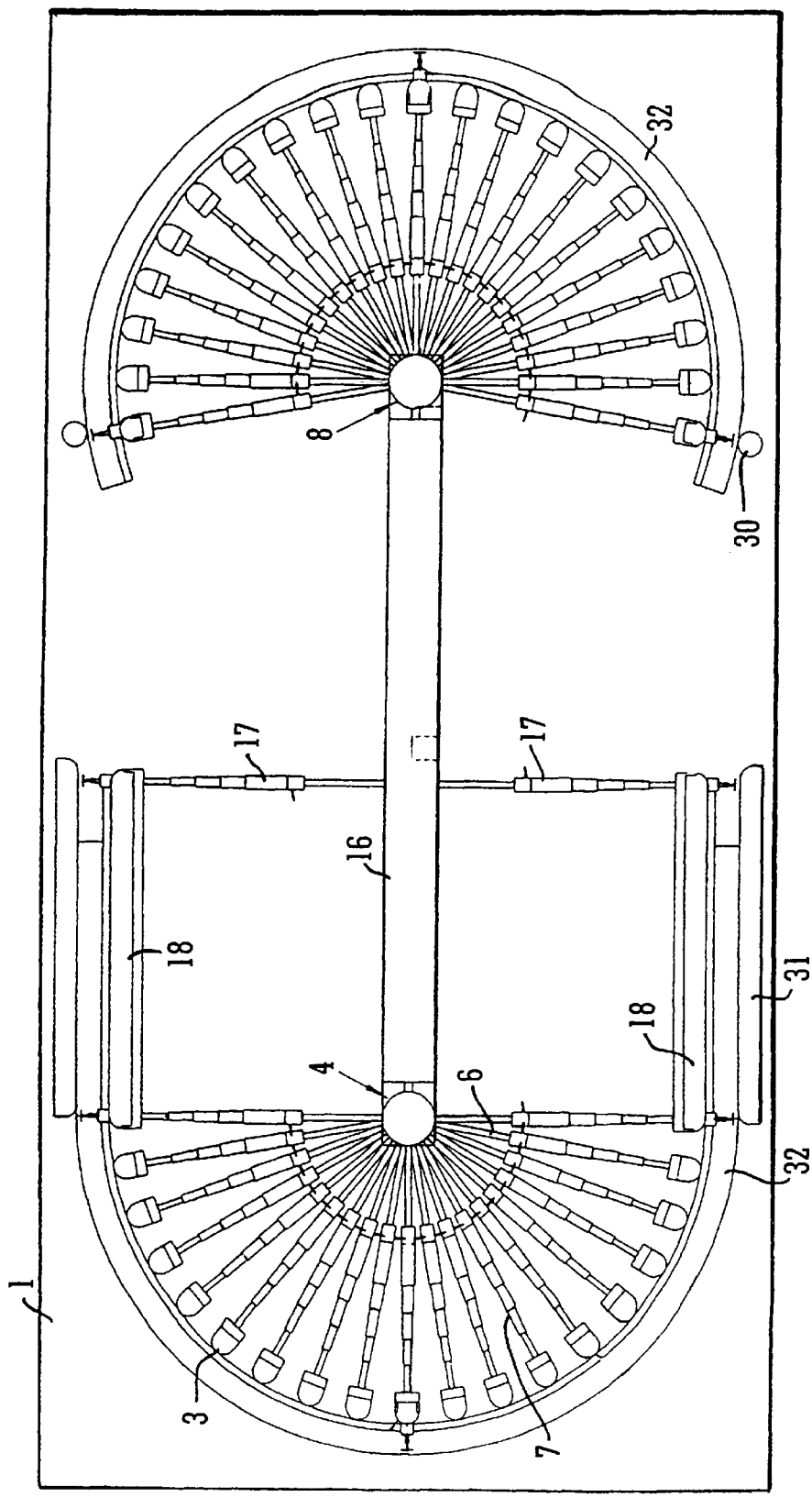
FIG. 1 is a diagrammatic plan view of a bending table illustrating a typical shape of arched section to be produced.

Referring now to the drawings, FIG. 1 illustrates a bending table 1 having a plain unslotted table top preferably of polished stainless steel upon which radial and linear arched shaped window sections may be produced. The table surface may comprise a thin plastics laminate 1a having a surface finish upon which a length of softened uPVC section may be placed without adversely affecting the under surface of the section. Beneath the thin laminate, and stainless steel, in one embodiment, is a wooden base mounted on legs to present a working surface at an operator's waist level.

A radial positioning system as illustrated in FIGS. 1 to 4 consists of a central spindle 4 having three independently rotating layers 4A, 4B and 4C. The spindle 4 may be positioned at any position along a slotted location strip 16 fixed along the centre line of the table 1. Each layer of the spindle defines a circumferential series of radially extending apertures 13 each adapted to receive one end of a radial arm comprising an elongate hollow sleeve 6. A number of such sleeves are provided, each removably retained within its associated aperture 13 by a spring clamp 13a.

A rod 7 is telescopically slidable within each rod 6 and adjustably fixed by a quick release catch 20 thus to determine, within a certain range, the effective length of each radially extending sleeve and rod 6, 7. Additional extension pieces may be attached to the rods 7 to extend their lengths further if necessary. Each rod 7 carries a telescopically extendible or flexible outer sheath 21.

Mounted fixedly on the outer end of each rod 17 is a bobbin 3 presenting a bearing surface, 22 and having an electromagnet 23 thus to be magnetically attracted to the surface 22 of the bending table 1. An upper part 24 of each bobbin carries toggle clamps 25 for attachment thereto of a former strip 26. A quick release spring clamp 27 enables a part 3a of each or some of the bobbins to be raised and lowered for adjustment with respect to the table surface, the former strip 26 and the heated section to be formed. The bobbin alternatively may be attracted to the table by a permanent magnet.

Figure 2:
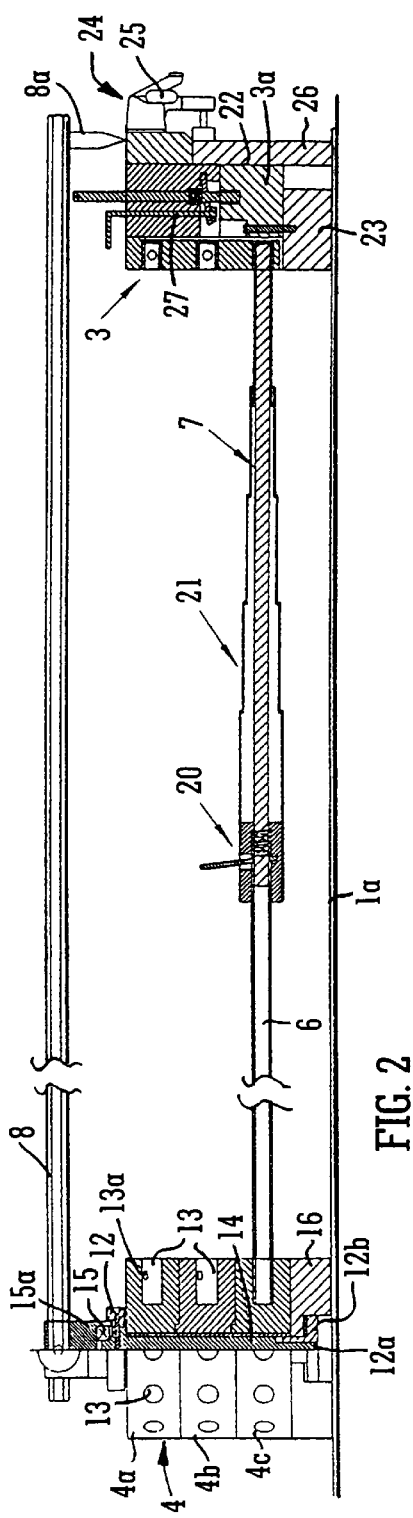
FIG. 2 is a side view of a radial positioning system mounted on a bending table in accordance with the invention.
Figure 3:
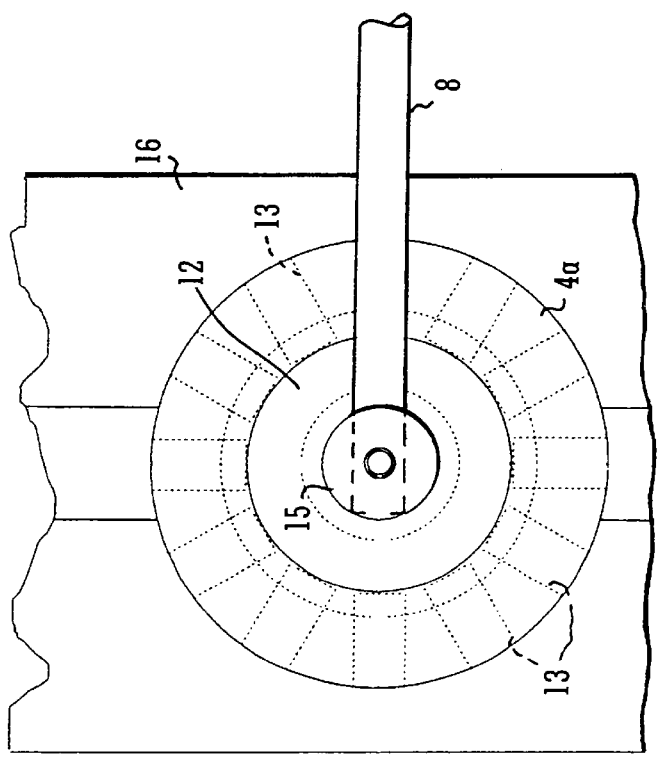
FIG. 3 is an enlarged plan view of the part illustrated in FIG. 2.
Figure 4A:
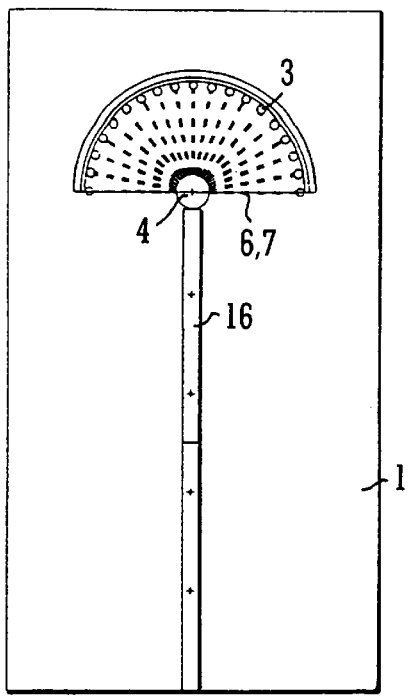
FIGS. 4A to 4D are diagrammatic plan views illustrating typical arch shaped sections to be produced.
Figure 4B:
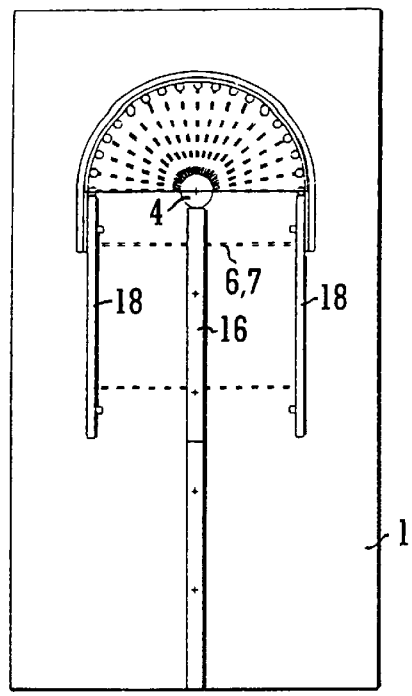
Figure 4C:
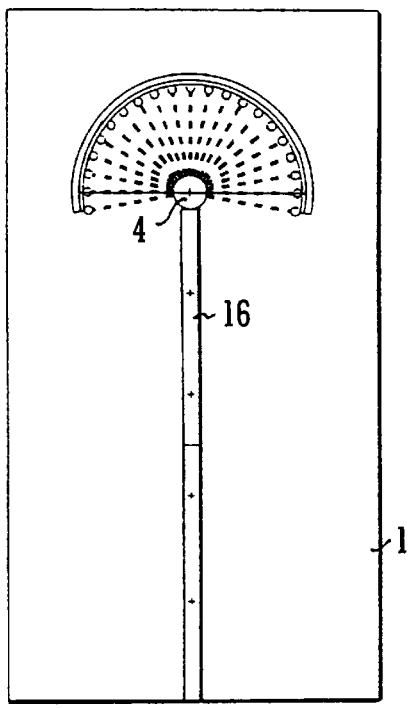
Figure 4D:
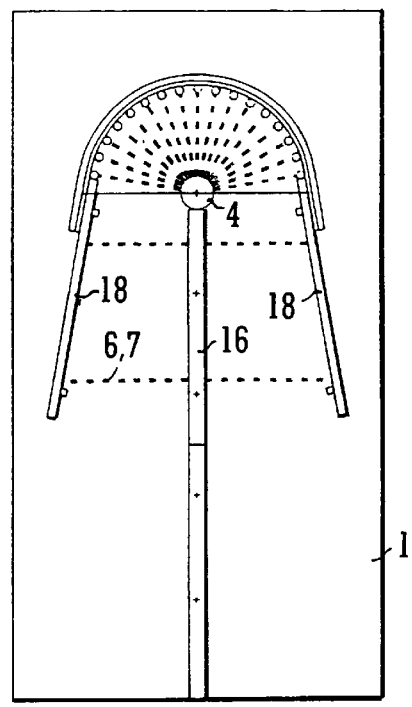

Thus as can be seen from FIG. 2, each separately rotatable layer of the spindle 4 may carry a plurality of radial arms and because the layers are independently rotatable it is possible either to spread the bobbins 3 evenly around a substantially semi-circular shape as illustrated or alternatively to group two or more of them closely together to produce acute bends as will become evident.

A central core member 14 of the central spindle 4 has an upper flange 12 and a bottom spigot 12a which is threadedly engaged in an anchor block 12b captively located on the inverted T-sectioned slot of strip 16. Thus by screwing down member 14 into anchor block 12b, the relative positions of the layers of the spindle 4 may be locked once they have been adjusted for a particular piece of work.

Permanently rotatable relative to upper flange 12 in a bearing 15, on a column 15a is a radial arm 8 which is radially extendible relative to column 15a and carries a pointer or stylus 8a.

Thus by rotating the arm 8 about the axis of the spindle 4, the position of each bobbin 3 around a semi-circular arc may be determined and set without having to measure the radial extent of each bobbin arm separately.

It will be appreciated with reference to FIGS. 1 and 2, that by positioning an arcuate series of bobbins on the table top 1 as illustrated it is then possible to extend around the bobbin the flexible former strip 26 around which there may be bent a length of heated and softened uPVC window or door frame section which is clamped in position to cool thus forming an arch.

If it is required to form the arched section with a pair of straight side sections thus to produce, for example, an arched window frame, there is provided on the table and adjustably mounted on slotted strip 16, a plurality of telescopically extendible arms 17. Mounted at the free end of the arms is a so-called fence 18 which may be similarly magnetically attracted to the table top and thus forms a straight edge along which a former and then a straight length of uPVC section may be positioned. The fences 18 may extend along the remaining length of the table, where a further radial positioning system may be provided as shown at the right hand end of FIG. 1. This may extend beyond a semi circle.

Figure 5A:
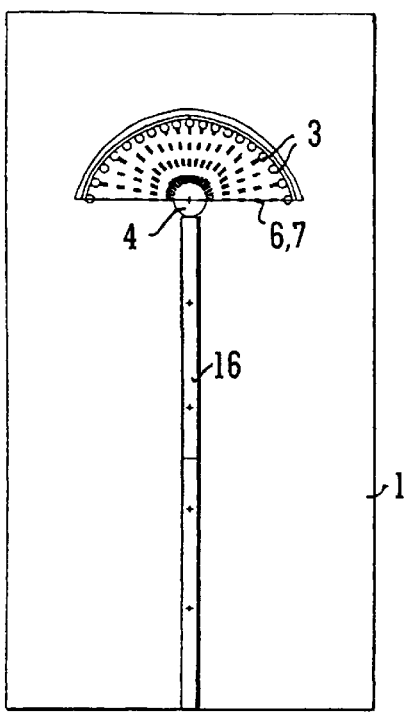
FIGS. 5A to 5D are similar diagrammatic views of a number of different arch shaped profiles to be produced.
Figure 5B:
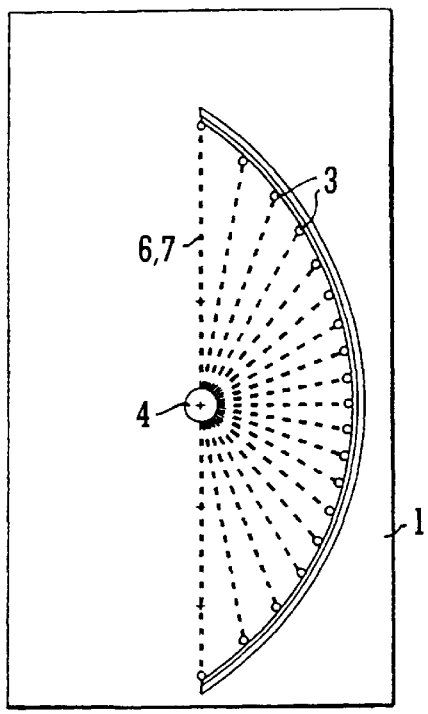
Figure 5C:
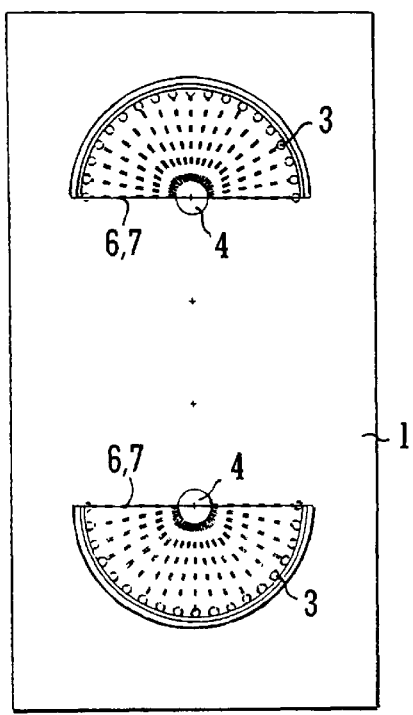
Figure 5D:
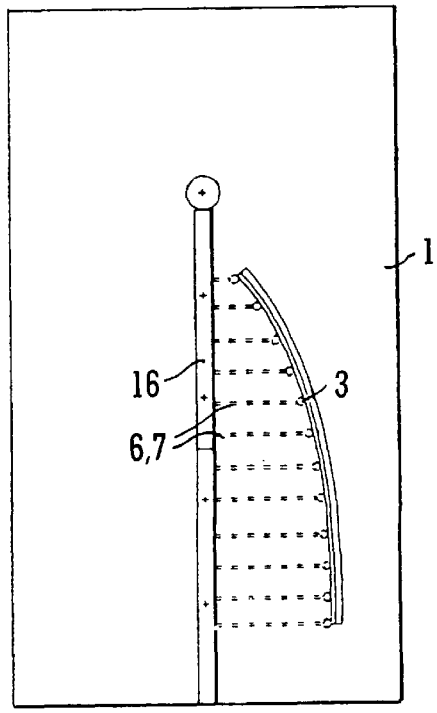

A linear positioning system may incorporate an aligned series of extendible arms 17 attached along the centre strip 16 of the table. The strip may have two layers of receiving apertures in which the arms 17 may be located. Such arms may have bobbins attached to their free ends and so may be used in a manner similar to the radial positioning system described in relation to FIGS. 1 and 2 and by using a template to position the bobbins, it is possible then to apply a former strip and a heated length of uPVC section to form a shallow arch of large and varying radius such as illustrated in FIG. 5D.

As can be seen in FIG. 1, independent, freely positionable and magnetically attractive bobbins 30 and fences 31 may be used on the table to retain the uPVC profile strips 32.

Thus, FIGS. 4A to 4D and 5D to 5D illustrate various forms of shaped section which may be produced using a bending table made in accordance with the invention. This wide variety of different shapes is easily attainable in view of the infinitely variable nature of the arms supporting the bobbins and fences. Such variation cannot be achieved on a slotted table or a table having a fixed shape of adaptor.

Embodiments of the invention may include both radial and linear positioning systems as illustrated in FIG. 1 or one or other of such systems alone. The bobbins, fences and table surface have been described as being magnetically attractive in order to provide adequate support and prevent movement of the bobbins on the rods.

This may be achieved by having the table top earthed and providing a supply of 12V +ve to electromagnets established in each bobbin and fence, or vice versa. However, the magnets may be permanent, or in some instances no magnetic attraction may be needed if there is sufficient rigidity in the structure to withstand any tendency for movement created when the former strip and section are placed around the structure. If electro-magnets are used a control or switching system may permit the user to select certain rows of the system to be magnetically active.

The principal advantages of this system when compared with conventional bending tables is that the table surface is unslotted, flat and smooth and will not mark the heated section thus removing the need for hardboard or like templates to be cut for each curve.

The system provides a considerable range of radii, for example, from 300 mm to 1050 mm. Also, any curved shape can be produced within the dimensions of the table by setting the bobbin positions as required to produce either a straight length or a curved shape with widely differing and varying curvatures. Setting up the table is a rapid and straight forward operation since no slots or clamped bobbins are required and the radial length of each arm for a curved profile is readily set by the rotating arm 8 with stylus 8a.

Each arm 6, 17 is easily removed from the spindle 4 (or the slotted strip 16). Thus, the arms may be interchanged at will to produce the required curvature, the arms being thus universally adjustable to produce non-uniform shapes. The arms 6 alternatively may be threadedly located in apertures 13 or by a radial screw accessible by an Allen key introduced through an aperture in the top of the spindle.

It will be appreciated that a bending table made in accordance with the invention is adaptable to produce uPVC section of any shape and configuration within the bounds of the table, a feature which cannot be achieved with any currently available conventional bending table.

What is claimed is:

1. A bending table comprising a table top, and a plurality of arms extending radially across the table top from a supporting member fixed with respect to the table top, at least some of said arms being adjustable in length or interchangeable, each arm having a bearing surface at its free end against which a flexible elongate work piece may be located; characterised in that the angle subtended by the or at least one pair of adjacent arms is adjustable.

2. A bending table according to claim 1, wherein the supporting member comprises at least two independently rotating spindles from which the arms radially extend.

3. A bending table according to claim 2, wherein the spindles are superimposed co-axially and each spindle defines a circumferential series of radially extending apertures each adapted to receive one end of a radial arm.

4. A bending table according to claim 1, wherein the supporting member is adjustable in position along a location strip extending along the table.

5. A bending table according to claim 1, in which each of said arms is telescopically adjustable in length.

6. A bending table according to claim 5, wherein each arm comprises a quick release catch to enable the effective length of the arm to be set.

7. A bending table according to claim 1, including a bearing member located at the outer radial end of each arm thus jointly to present a bearing surface for a workpiece.

8. A bending table according to claim 7, wherein each bearing member is adjustable vertically with respect to the table top and includes a clamp for attachment to the associated bearing member of a workpiece or backing strip.

9. A bending table according to claim 2 or claim 3, including locking means operable to fix the relative positions of the independently rotating spindles.

10. A bending table according to claim 1, wherein the supporting member includes a further radially extending arm carrying at its outer end a marking device adapted to measure and set the radial length of each of the said plurality of arms without having to measure the radial extent of each arm separately.

11. A bending table according to claim 4, including a plurality of further telescopically extendible arms attached to said location strip and extending therefrom transversely across the table top each said further arm having a bearing surface at its free end whereby a number of such arms extending from the location strip may support a linear workpiece.

12. A bending table according to claim 11, including one or more linear fences attached to or forming the bearing surface of a number of said further telescopically extendible arms, to provide a support for a linear workpiece.

13. A bending table comprising a table top, and a plurality of arms extending across the table top from a supporting member fixed with respect to the table top, at least some of said arms being adjustable in length or interchangeable, each arm having a bearing at its free end against which a flexible elongate workpiece may be located; characterised in that the bearing members and table surface are mutually magnetically attractive.

14. A bending table according to claim 13, wherein the table top is comprised of a ferro-magnetic material such as stainless steel, at least some of said plurality of arms including a magnet thus to be attracted to the table surface.

15. A bending table according to claim 14, wherein the table surface is comprised of a plastics material having a surface finish upon which softened UPVC section may be placed without adversely affecting the under surface of the section.

16. A bearing surface according to claim 13, including an electro-magnet at the outer free end of each of the plurality of arms.

17. A bending table according to claim 14, wherein the ferro-magnetic table top is earthed, an electromagnet at the outer radial end of each arm being provided with a positive electrical supply at or close to 12 volts.

18. A bending table comprising a table top, and a plurality of arms extending across the table top from a supporting member fixed with respect to the table top, at least some of said arms being adjustable in length or interchangeable, each arm having a bearing at its free end against which a flexible elongate workpiece may be located; characterized in that the bearing members and table surface are mutually magnetically attractive and including an electrical control system permitting selected ones of said plurality of arms to be magnetically active.

* * * * *